United States Patent [19]

Yamada et al.

[11] Patent Number: 4,814,660
[45] Date of Patent: Mar. 21, 1989

[54] PIEZOELECTRIC MOTOR WITH MULTILAYER PIEZOELECTRIC ELEMENTS

[75] Inventors: Hiroaki Yamada; Eiichi Sato, both of Tokyo, Japan

[73] Assignee: NEC Corporation, Japan

[21] Appl. No.: 154,900

[22] Filed: Feb. 11, 1988

[30] Foreign Application Priority Data

Feb. 12, 1987 [JP] Japan .................................. 62-30561

[51] Int. Cl.$^4$ ............................................. H01L 41/08
[52] U.S. Cl. ................... 310/328; 310/323; 310/317
[58] Field of Search ........................ 310/317, 323, 328

[56] References Cited

U.S. PATENT DOCUMENTS

| 4,339,682 | 7/1982 | Toda et al. ....................... 310/328 X |
| 4,455,501 | 6/1984 | Tojo et al. ........................... 310/328 |
| 4,495,432 | 1/1985 | Katsuma et al. ..................... 310/328 |
| 4,523,121 | 6/1985 | Takahashi et al. ................... 310/334 |
| 4,578,607 | 3/1986 | Tojo et al. ........................... 310/328 |
| 4,585,969 | 4/1986 | Tanaka et al. ....................... 310/328 |
| 4,613,782 | 9/1986 | Mori et al. ....................... 310/328 X |
| 4,622,483 | 11/1986 | Staufenberg, Jr. et al. ......... 310/328 |
| 4,686,440 | 8/1987 | Hatamura et al. ............... 310/328 X |
| 4,757,223 | 7/1988 | Veyama ........................... 310/328 X |

FOREIGN PATENT DOCUMENTS

0851565 7/1981 U.S.S.R. ............................... 310/328

*Primary Examiner*—Mark O. Budd
*Attorney, Agent, or Firm*—Leydig, Voit & Mayer

[57] ABSTRACT

The specification discloses a piezoelectric motor which comprises an actuator and a rotor. The actuator includes a frame which has at least three arms extending from the center of the frame in a radial direction so that tip portions of the arms are situated on the same circumference. The actuator further includes multilayer piezoelectric elements formed by stacking a plurality of piezoelectric sections along a stack axis. The elements are placed respectively between adjacent arms in the frame so as to make the adjacent arms symmetrical to each other in regard to a line passing through the center and perpendicular to the stack axis. The rotor is supported in a freely rotatable manner around an axis passing through the center of the frame. The rotor has an inner wall inscribed with the tip portions of the arms and is rotated with a driving force generated on the tip portions when driving voltages having a predetermined phase difference from each other are applied to the multilayer piezoelectric elements.

26 Claims, 9 Drawing Sheets

Fig. 4A (TIME=$t_0$)  Fig. 4B (TIME=$t_1$)  Fig. 4C (TIME=$t_2$)

Fig. 4D (TIME=$t_3$)  Fig. 4E (TIME=$t_4$)  Fig. 4F (TIME=$t_5$)

Fig.7A (TIME=t0)

Fig.7B (TIME=t1)

Fig.7C (TIME=t2)

Fig.7D (TIME=t3)

Fig.7E (TIME=t4)

Fig.7F (TIME=t5)

Fig.7G (TIME=t6)

Fig.7H (TIME=t7)

Fig.7I

PIEZOELECTRIC MOTOR WITH MULTILAYER PIEZOELECTRIC ELEMENTS

BACKGROUND OF THE INVENTION

This invention relates to a piezoelectric motor employing electrostrictive vibration of piezoelectric (electrostrictive) elements, and more particularly to a piezoelectric motor using multilayer piezoelectric elements.

A piezoelectric motor uses for its drive the electrostrictive strain induced when a voltage is applied on a piezoelectric element. Since a piezoelectric motor does not need a coil required in the conventional electric motor, the piezoelectric motor is simpler in structure and reduced in size compared to a conventional motor. The piezoelectric motor is further advantageous in that low speed rotation is achievable in a large torque without the use of reduction means such as gears. An example of such a piezoelectric motor is described in U.S. Pat. No. 4,495,432 in which piezoelectric elements generate traveling waves to rotate a rotor. However, the piezoelectric motor of U.S. Pat. No. '432 has the disadvantage that it needs a high driving voltage since it uses piezoelectric elements utilizing transverse electrostrictive effect.

SUMMARY OF THE INVENTION

It is an object of the invention to obviate the aforementioned disadvantage encountered in the prior art and to provide a piezoelectric motor driven by a low voltage.

According to the invention, a piezoelectric motor comprises an actuator which includes a frame having at least three arms extending radially from the center. Tip portions of the arms are positioned on the same circumference. The actuator also includes multilayer piezoelectric elements in a form of a stack, which are respectively placed between adjacent arms in such a manner that the adjacent arms are arranged symmetrically to each other with respect to a line passing through the center and perpendicular to the direction of the stack. The motor also comprises a rotor which is supported in a freely rotatable manner around the axis passing through the center of the frame, and which has inner wall inscribed with the tip portions of the arms. The rotor is rotated with driving force generated on the tip portions when voltages having a predetermined phase difference from each other are applied on the multilayer piezoelectric elements.

According to the invention, a piezoelectric motor may also comprise a stater, a plurality of multilayer piezoelectric elements, a rotor, and a driving circuit. The stater includes a base member and an actuator having a plurality of recesses and a plurality of arms including tip portions. The plurality of multilayer piezoelectric elements are secured in the recesses of the actuator. The rotor has an inner wall in contact with the tip portions of the arms of the actuator. The driving circuit is connected to supply driving voltages to the piezoelectric elements to produce a longitudinal electrostrictive effect and deform the piezoelectric elements. This deforms the actuator and rotates the rotor.

BRIEF DESCRIPTION OF THE DRAWINGS

The above and other objects, features and advantages of the present invention will become apparent from the following detailed description when taken with the accompanying drawings wherein.

DESCRIPTION OF THE PREFERRED EMBODIMENTS

Figure 1A:
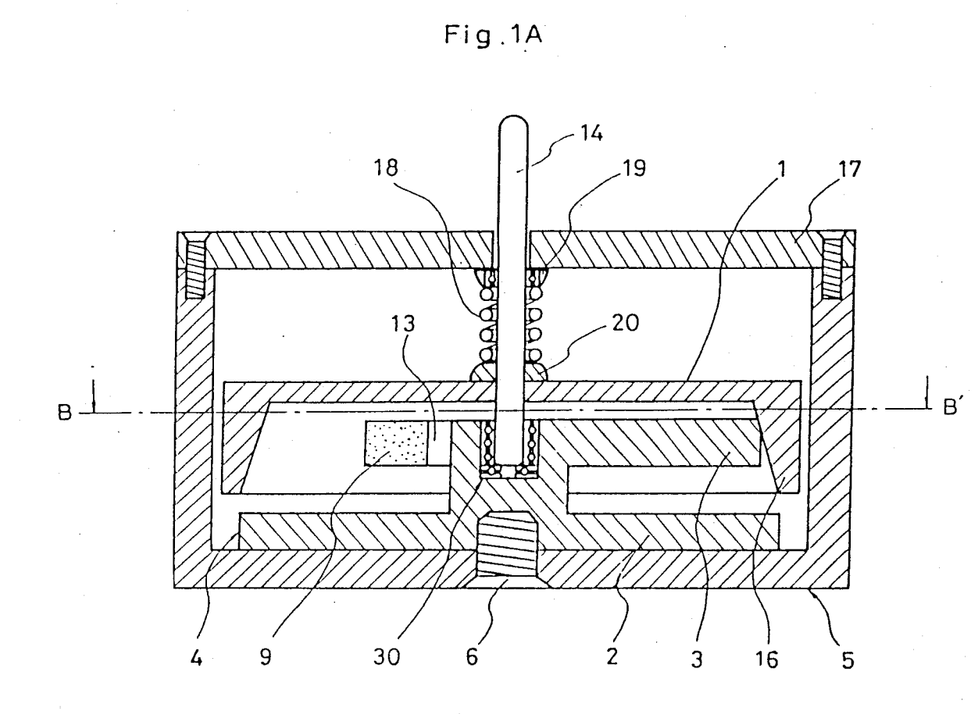
FIG. 1A is a longitudinal sectional view of a first embodiment of the invention.
Figure 1B:
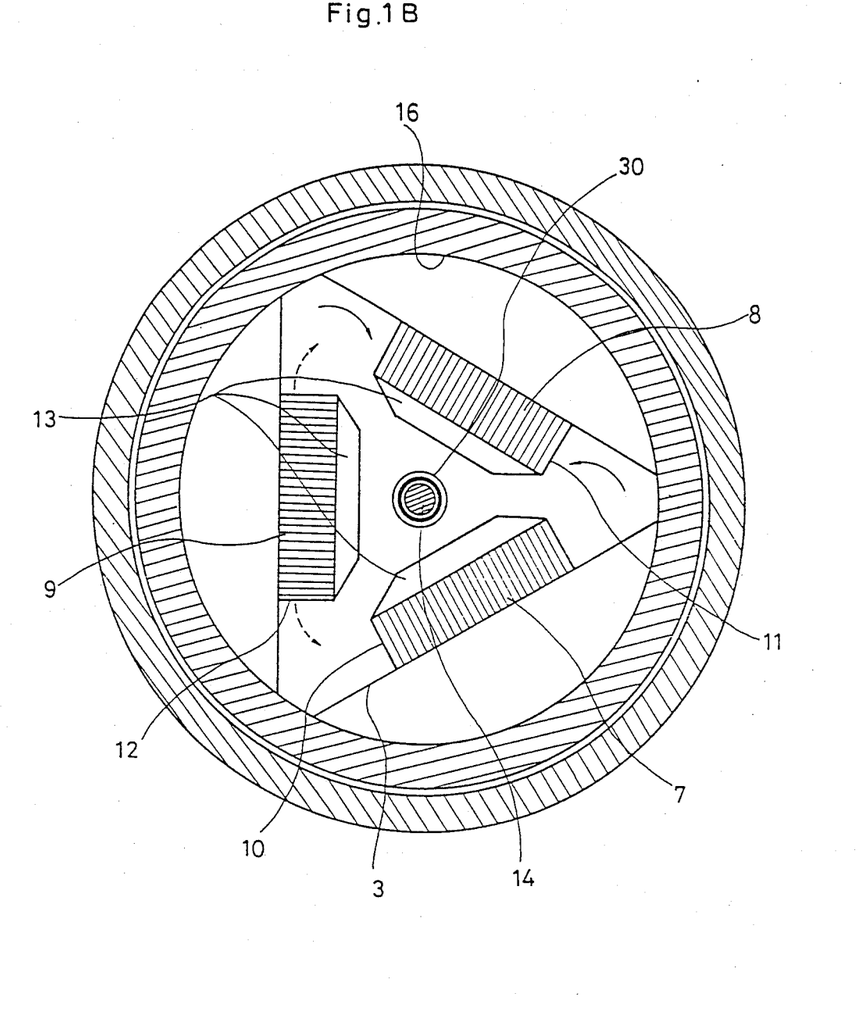
FIG. 1B is a cross sectional view at the line B—B' in FIG. 1A.

Referring to FIGS. 1A and 1B, a piezoelectric motor of the invention includes a rotor 1, and a stator 4 having a base member 2 and a triangle shaped actuator 3. The base member 2 of the stator 4 is secured on a case 5 with a screw 6, and each side of the actuator 3 has recesses 10–12 for securing respective multilayer piezoelectric elements (referred to as "piezo elements") 7–9 with adhesives. Through holes 13 are bored as extension of the recesses 10–12, and allows the actuator 3 to be deformed easily by the piezo elements 7–9. A shaft 14 is mounted at the center of the actuator 3 with bearings 30 which comprise radial bearings and thrust bearings. More definitely, the actuator 3 includes a frame having three arms 31–33 radially extending from the center of the frame. Tip portions 34–36 of the arms 31–33 are positioned on the same circumference at an even interval. The actuator 3 also includes the piezo elements 7–9 which are placed between adjacent arms of the frame so that arms are arranged symmetrically in respect of a line passing through the center of the frame and perpendicular to the direction of a stack of the piezo element. A driving circuit 200 (FIG. 2) supplies driving voltages which differ in phase by 120° from each other to the piezo elements 7–9. The piezo elements 7–9 are formed by stacking a plurality of piezoelectric sections with longitudinal electrostrictive effect which has two to three times as great a deformation as the transverse electrostrictive effect responsive to the same applied voltage. The stacking of the piezoelectric sections together with the longitudinal electrostrictive effect can produce greater deformation with decreased driving voltage, resulting in miniaturization of the driving circuit and reduction in cost. Such piezo elements are described, for instance, in U.S. Pat. No. 4,523,121 which is incorporated herein by reference. The rotor 1 is formed of a sleeve with a bottom, and the inner wall 16 thereof is tapered to secure the contact with the tip portions 34–36 of the actuator 3. A shaft 14 is fixed at the center of the rotor 1 and a lid 17 of the case 5 with a fixing member 20 and bearings 19 so that the rotation of the rotor 1 is transmitted to the shaft 14. The rotor 1 is pressed downward with a spring to thereby secure the contact of the wall 16 with the tip portions 34–36.

Figure 1C:
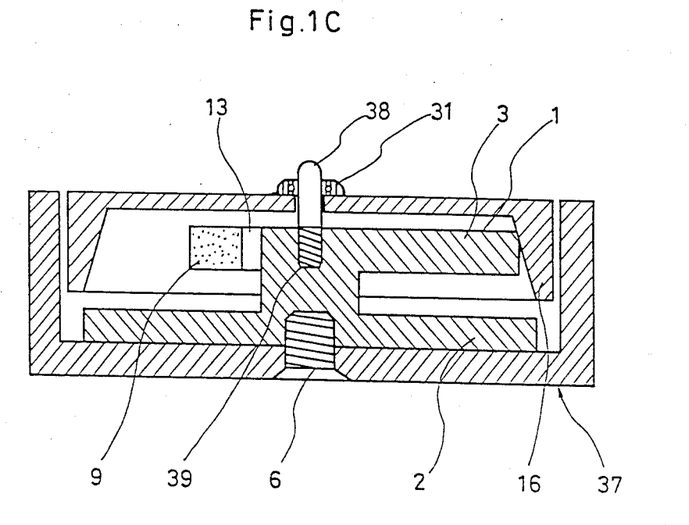
FIG. 1C is a longitudinal sectional view of a second embodiment of the invention.

FIG. 1C shows a longitudinal cross section of a second embodiment of the invention. Although the rotation of the motor is transmitted through the shaft as in the structure shown in FIGS. 1A and 1B, the rotation may be transmitted directly through the rotor 1. In the second embodiment, a case 37 does not have a lid. A shaft 38 is fixed within a threaded hole 39 bored at the center of the actuator 3. The shaft 38 is also supported by a bearings 31 which is in turn fixed to the rotor 1. In the motor of this type, the bearings 19 and 30 and the spring 18 may be omttted.

Figure 2:
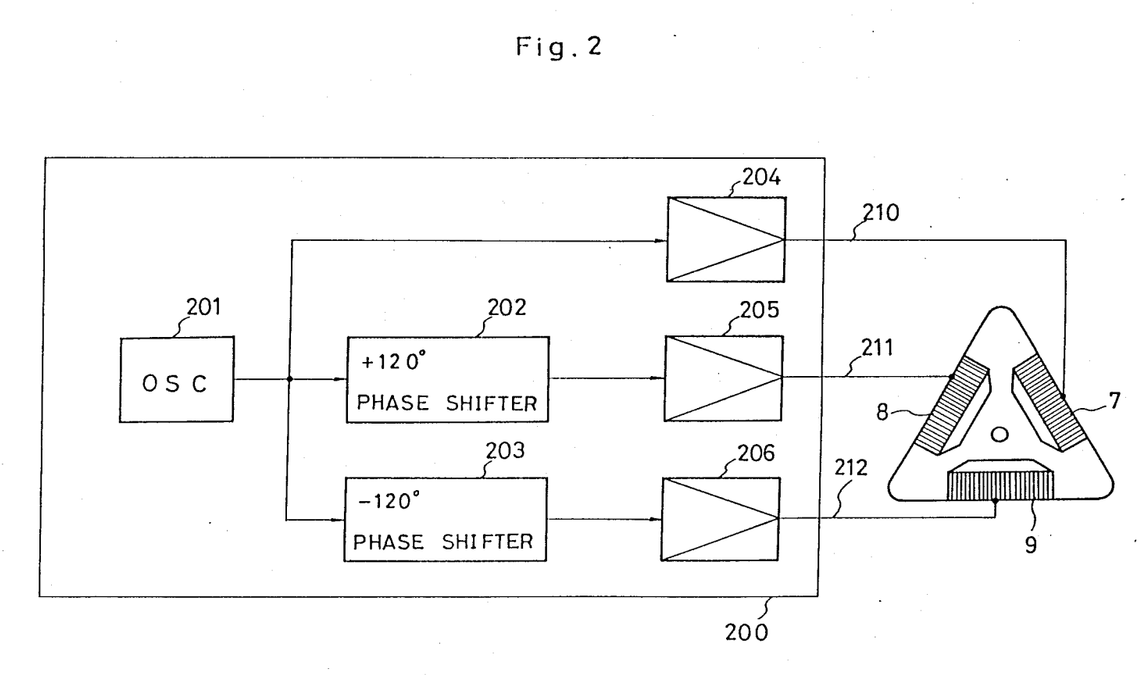
FIG. 2 is a block diagram for showing the connection between the piezoelectric motor shown in FIG. 1A and the driving circuit thereof.

FIG. 2 is a block diagram of a driving circuit for use with the piezoelectric motor. A driving circuit 200 comprises an oscillator 201, a phase shifter 202 which shifts the phase of the output signal from the oscillator 201 by $+120°$, a phase shifter 203 which shifts the phase of the oscillator output signal by $-120°$, and amplifiers 204–206. The phase difference is determined by T/N wherein the number of the piezo elements is denoted as N and the period of the oscillator output signal as T.

Figure 3A:
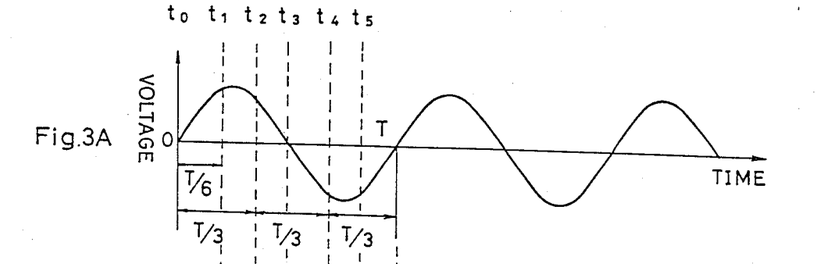
FIGS. 3A-3C show waveforms of voltages from the driving circuit shown in FIG. 2.
Figure 3B:
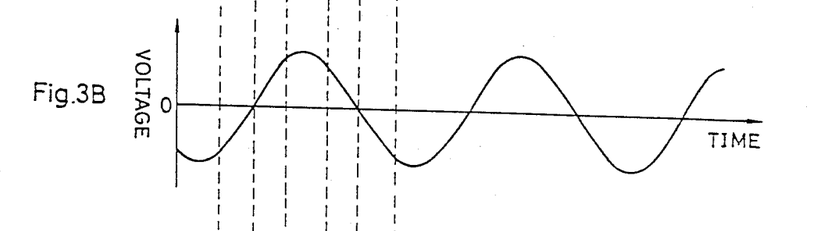
Figure 3C:
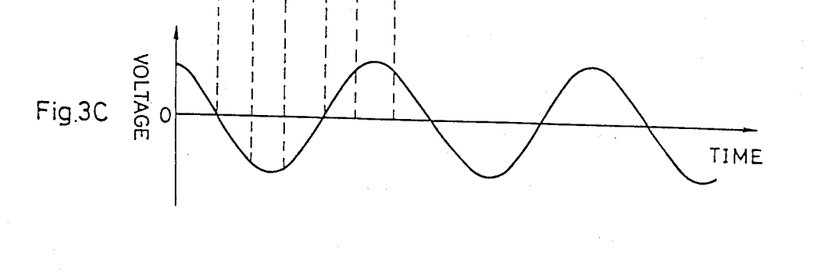

Referring to FIGS. 4A–4G, the operation of the motor shown in FIGS. 1A and 1B will now be described. It is assumed that the driving circuit 200 and the piezo elements 7-9 are connected as shown in FIG. 2 and that the output voltages 210-212 as shown in FIGS. 3A-3C are applied to the piezo elements, respectively. One period T of the output voltages is divided into six time intervals which are denoted as $t_0$-$t_5$, respectively. When the output voltages of FIGS. 3A-3C are applied to the piezo elements 7-9, the actuator 3 of the stator 4 is deformed in accordance with the deformations of the piezo elements 7-9. FIGS. 4A-4F schematically illustrate the state of deformation at the times $t_0$-$t_5$. It should be noted that the respective sides on which piezo elements are respectively placed are denoted with the same reference numerals throughout FIG. 4A-4G. Triangles with broken lines represent the states before the deformation while those with solid lines represent the states thereafter.

Figure 4A:
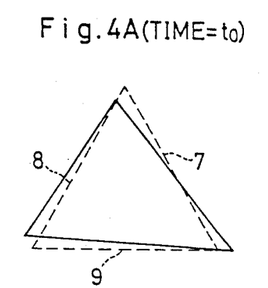
FIGS. 4A-4G are illustrations for explaining the operation of the first embodiment.
Figure 4B:
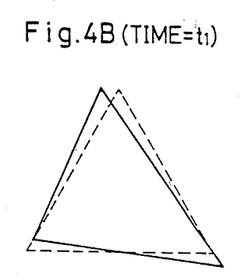
Figure 4C:
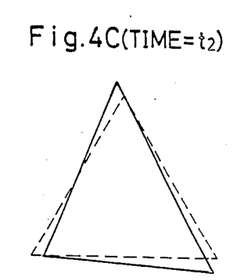
Figure 4D:
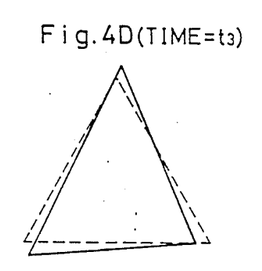
Figure 4E:
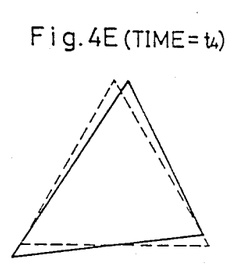
Figure 4F:
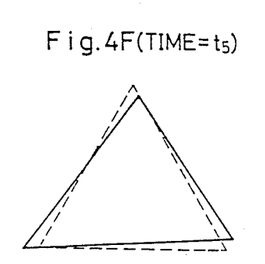
Figure 4G:
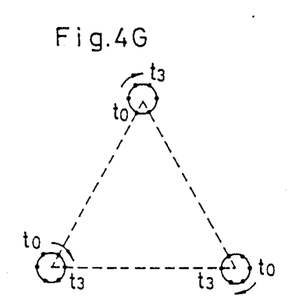

As shown in FIGS. 3A-3C at the time $t_0$, no voltage is applied to the element 7, a negative voltage is applied to the element 8, and a positive voltage is applied to the element 9. This contracts the element 8 in the direction shown by the solid line arrows in FIG. 1B and expands the element 9 in the direction shown by broken line arrows. As a result, the sides of the actuator 3 are deformed as shown by solid line in FIG. 4A. At the time $t_1$, as the element 8 is kept contracted, the element 7 is expanded and the element 9 is neither contracted nor expanded, the actuator 3 is deformed as shown in FIG. 4B. Similarly, at the times $t_2$, $t_3$, $t_4$ and $t_5$, the actuator 3 is deformed in correspondence to the voltages applied on the sides thereof as shown in FIGS. 4C-4F. If the positions of the tip portions 34-36 of the actuator 3 at the times $t_0$-$t_5$ are plotted continuously, their loci become circles. The circular movement of the portions 34-36 rotates the rotor 1. In this case, the rotor 1 rotates to the right, but the rotational direction may be reversed by reversing the phase relations among driving voltage.

Figure 5:
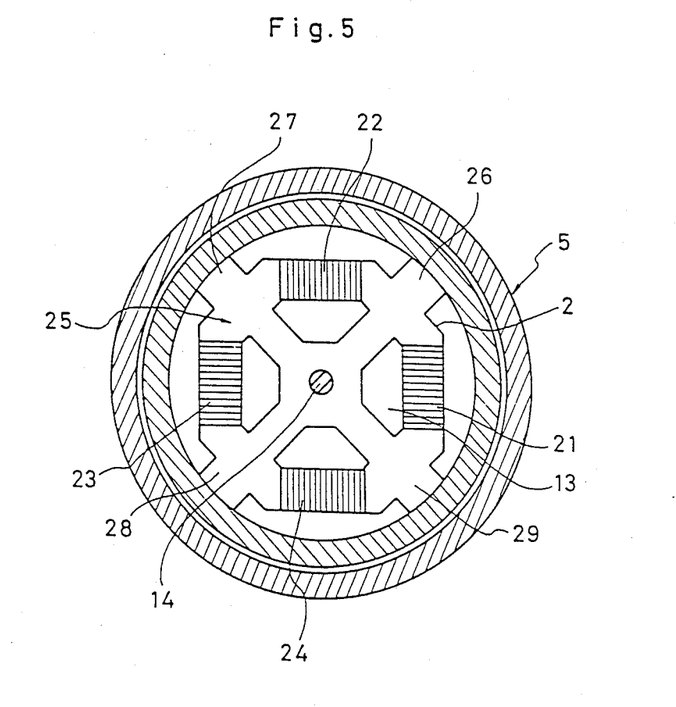
FIG. 5 is a cross sectional view of a third embodiment of the invention.

FIG. 5 is a cross sectional view of the third embodiment of the invention where four multilayer piezoelectric elements 21-24 are used. The same structural elements as those in FIGS. 1A-1C are denoted with the same reference numerals in FIG. 5. In FIG. 5, an actuator 25 of the stator 4 is shaped as a square dependent on the number of the piezoelectric elements 21-24, and is provided with four tip portions 26-29 to contact rotor 1. The four elements 21-24 necessitate the driving voltages having the phase difference of T/4 as shown in FIGS. 6A-6D. Such a driving circuit can be constructed with an oscillator, phase shifters and amplifiers combined in a manner similar to the driving circuit 200 used for the first embodiment.

Figure 6A:
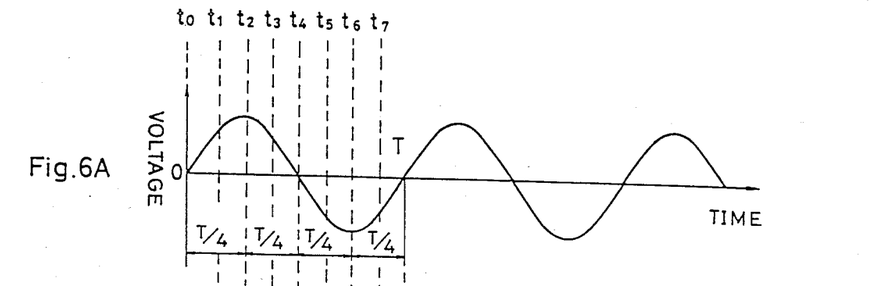
FIGS. 6A-6D show waveforms of voltages to be applied on the piezoelectric motor shown in FIG. 5.
Figure 6B:
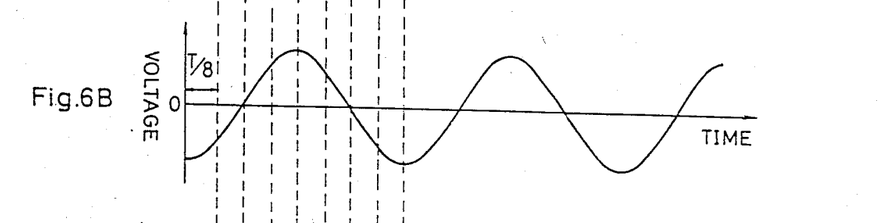
Figure 6C:
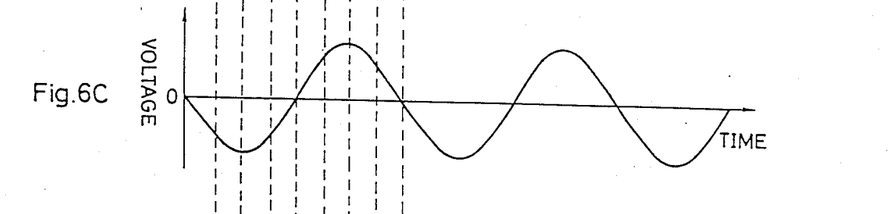
Figure 6D:
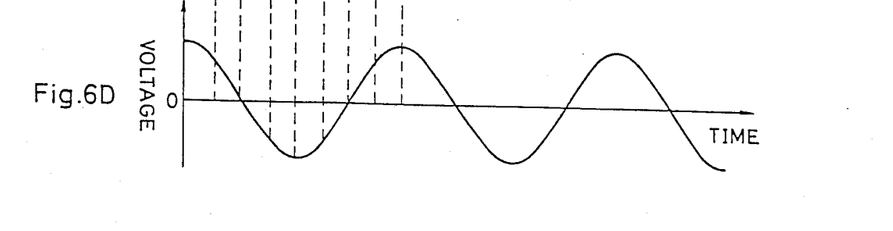
Figure 7A:
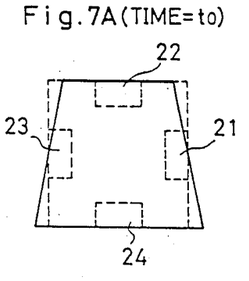
FIGS. 7A-7I are illustrations for explaining the operation of the third embodiment of the invention.
Figure 7B:
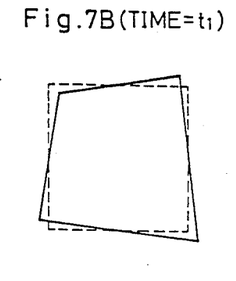
Figure 7C:
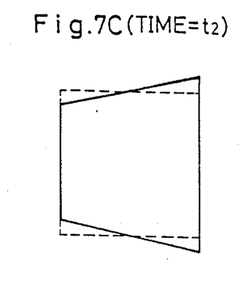
Figure 7D:
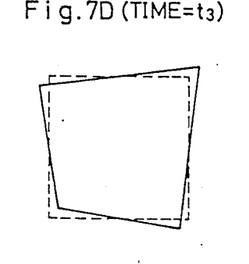
Figure 7E:
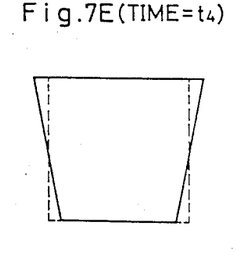
Figure 7F:
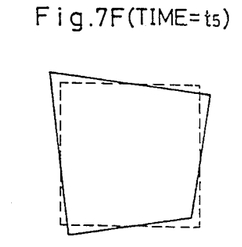
Figure 7G:
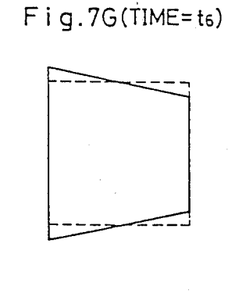
Figure 7H:
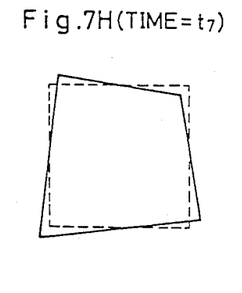
Figure 7I:
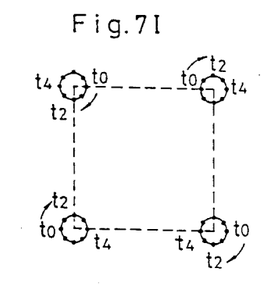

The operation of the motor shown in FIG. 5 will now be described by referring to FIGS. 6A-6D and 7A-7I. FIGS. 6A-6D show the driving voltage waveforms having the phase difference by T/4 respectively between adjacent voltages. When the voltage of FIG. 6A is applied to the element 21 and the voltages of FIGS. 6B-6D are applied likewise to the elements 22-24, the actuator 25 is deformed in accordance with the deformations of the elements 21-24. The deformation of the stator 3 at the times $t_0$-$t_7$ are schematically shown of FIGS. 7A-7H, respectively. In the figures, broken lines show the state where a voltage is not applied to any of the multilayer piezoelectric elements while the solid lines show the state of deformation. More particularly, at the time $t_0$, as the voltage is zero as shown in FIGS. 6A and 6C, the piezo elements 21 and 23 are not deformed. However, since the maximum negative and positive voltages are applied to the elements 22 and 24, the elements 22 and 24 are contracted and expanded in response to the negative and positive voltages. As a result, the actuator 25 is deformed as shown by the solid lines in FIG. 7A. At the time $t_1$, equal positive voltages are applied to the elements 21 and 24, and equal negative voltages are applied to the elements 22 and 23. It follows that, the actuator 25 is deformed as shown by the solid lines in FIG. 7B. In this case, the deformations appearing on the elements 23 and 24 are smaller than those occurring at the time $t_0$. Similarly, at the times $t_2$-$t_7$, the actuator 25 is deformed as shown in FIGS. 7C-7H. If the movements of the tip portions 26-29 of the actuator 25 are plotted as shown in FIGS. 7A-7H, they become circular movements as shown in FIG. 7I, which rotates the rotor.

The number of the piezo elements described in the foregoing is not limited to three or four, but it may be an arbitrary number determined by the size of a stator.

Various materials may be used for the rotor and the stator for the piezoelectric motor according to this invention. Stainless steel may be used, for example, for the rotor and stator because of its advantageous processability in aforementioned embodiments.

As described in detail in the above embodiments, the present piezoelectric motor with multilayer piezoelectric elements using longitudinal electrostrictive effect is capable of driving the motor with lower voltage thus reducing the cost and the size of a driving circuit.

What is claimed is:

1. A piezoelectric motor comprising;
    actuator means including a frame which has at least three arms extending from a center of the frame in the radial direction so that tip portions of the arms are situated on the same circumference and multilayer piezoelectric elements formed by stacking a plurality of piezoelectric sections in a stack axis, said elements being placed respectively between adjacent arms in said frame so as to make said adjacent arms symmetrical to each other in regard to a line passing through said center and perpendicular to the stack axis; and
    rotor means which is supported in a freely rotatable manner around an axis passing through said center of the frame and which has an inner wall inscribed with the tip portions of said arms, said rotor means being rotated with driving force generated on said tip portions when driving voltages having a predetermined phase difference from each other are applied to said multilayer piezoelectric elements.

2. A piezoelectric motor as claimed in claim 1 wherein deformations induced in said multilayer piezoelectric elements are based on a longitudinal electrostrictive effect of said plurality of piezoelectric sections.

3. A piezoelectric motor as claimed in claim 1 further comprising pressing means for pressing said rotor against said actuator.

4. A piezoelectric motor as claimed in claim 1 wherein the phase difference of said driving voltages is varied with the number of said multilayer piezoelectric elements and the period of said driving voltages.

5. A piezoelectric motor as claimed in claim 1 wherein said driving voltages have sinusoidal waveforms.

6. A piezoelectric motor as claimed in claim 1 wherein said inner wall is tapered.

7. A piezoelectric motor as claimed in claim 1 wherein said rotor is formed of a sleeve with a bottom.

8. A piezoelectric motor as claimed in claim 1 further comprising shaft means supported at the center of said actuator to pass through the center of the rotor.

9. A piezoelectric motor as claimed in claim 8 wherein said shaft is rotatable at the center of the actuator.

10. A piezoelectric motor as claimed in claim 9 further comprising means for securing said rotor and said shaft.

11. A piezoelectric motor as claimed in claim 8 wherein said shaft is secured at the center of said actuator.

12. A piezoelectric motor as claimed in claim 11 wherein said rotor has bearings for said shaft.

13. A piezoelectric motor as claimed in claim 1 wherein said rotor is mounted on the stator with said tip portions of said arms.

14. A piezoelectric motor as claimed in claim 13 wherein said rotor is mounted on the stator through said shaft.

15. A piezoelectric motor comprising:

a stator having a base member and an actuator, the actuator having a plurality of recesses and plurality of arms including tip portions;

a plurality of multilayer piezoelectric elements secured in the recesses of the actuator;

a rotor with an inner wall in contact with the tip portions of the arms of the actuator; and a driving circuit connected to supply driving voltages to the piezoelectric elements to produce a longitudinal electrostrictive effect and deform the piezoelectric elements, thereby deforming the actuator and rotating the rotor.

16. A piezoelectric motor as claimed in claim 15 wherein the driving circuit comprises an oscillator.

17. A piezoelectric motor as claimed in claim 16 wherein the oscillator comprises a sinusoidal wave generator.

18. A piezoelectric motor as claimed in claim 16 wherein the driving circuit further comprises a phase shifter.

19. A piezoelectric motor as claimed in claim 15 wherein the rotor and the stator are made of stainless steel.

20. A piezoelectric motor as claimed in claim 15 further comprising a shaft fixed to the center of the actuator and wherein the rotor rotates about the shaft.

21. A piezoelectric motor as claimed in claim 15 further comprising a shaft mounted at the center of the actuator and fixed to the rotor to rotate therewith.

22. A piezoelectric motor as claimed in claim 15 wherein the plurality of arms consists of three arms, the plurality of recesses consists of three recesses, and the plurality of multilayer piezoelectric elements consists of three multilayer piezoelectric elements.

23. A piezoelectric motor as claimed in claim 15 wherein the plurality of arms consists of four arms, the plurality of recesses is four recesses, and the plurality of multilayer piezoelectric elements is four multilayer piezoelectric elements.

24. A piezoelectric motor as claimed in claim 1 further comprising adhesives which secure the piezoelectric elements to the actuator.

25. A piezoelectric motor as claimed in claim 1 wherein the rotor and the stator are made of stainless steel.

26. A piezoelectric motor as claimed in claim 1 wherein the actuator is in the shape of a triangle.

* * * * *